J. P. STANTON & R. C. PEDRICK.
Transplanters.
No. 134,775.          Patented Jan. 14, 1873.
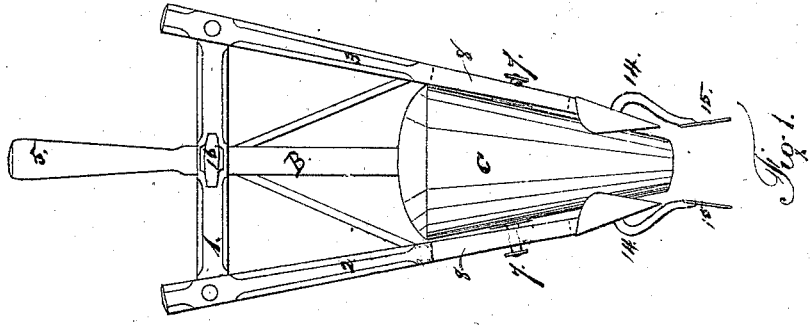
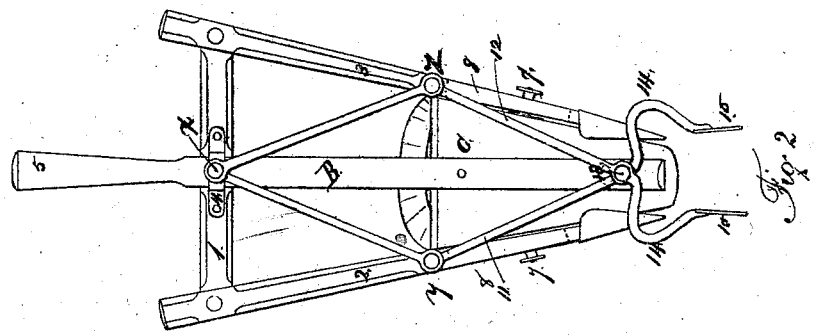
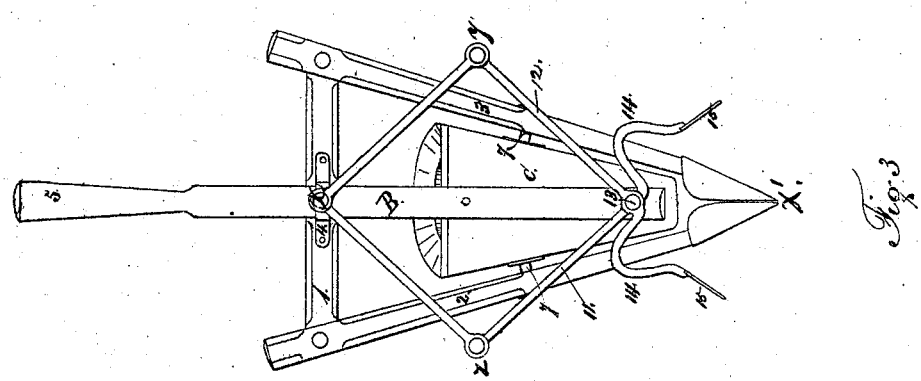
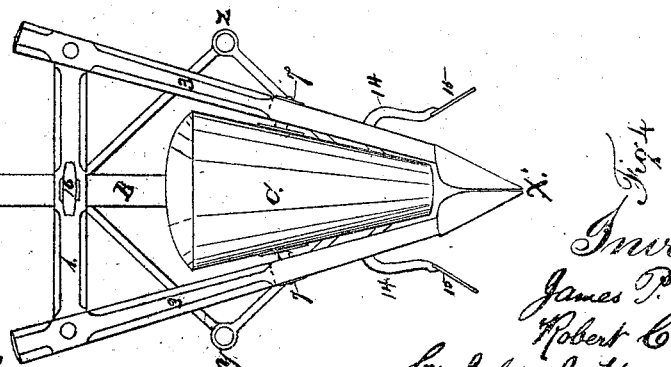
Witnesses
W. Bradford
J. S. P. Williams
Inventors
James P. Stanton
Robert C. Pedrick
by John J. Halsted
their Atty.

UNITED STATES PATENT OFFICE.

JAMES P. STANTON AND ROBERT C. PEDRICK, OF PEDRICKTOWN, NEW JERSEY.

IMPROVEMENT IN TRANSPLANTERS.

Specification forming part of Letters Patent No. 134,775, dated January 14, 1873.

*To all whom it may concern:*

Be it known that we, JAMES P. STANTON and ROBERT C. PEDRICK, of Pedricktown, county of Salem and State of New Jersey, have invented certain Improvements in Transplanters; and we do hereby declare that the following, taken in connection with the drawing which accompanies and forms part of this specification, is a description of our invention sufficient to enable those skilled in the art to practice it.

Figure 1 is a front view, and Fig. 2 a back view, of our transplanter with the funnel at its lowest point, and the pressers in position to press the earth against the root of the plant; Fig. 3 is a back view; and Fig. 4 a front view, when the central bar is raised.

A is a frame, composed of three members, namely, a cross-bar, 1, and two bars, 2 3, each pivoted or swung to the cross-bar, and converging toward each other, and so shaped at their lower ends, somewhat in the form of shovels, that when brought together as hereinafter described, they form, as seen in Fig. 4, a broad sharp shovel-edge capable of being easily forced into the earth to make a hole to receive the plant. The shovel form is given by making each shovel with a flange at each of its sides, such flange being of greatest width at the top, and tapering downward. The flanges of one shovel thus lie close to those of the other when they are closed, the two forming, as it were, a box. B is a central vertical bar, arranged to be slidden vertically through a hasp or guide, 4, on bar 1, and having at its upper end a handle, 5, and at its lower end a funnel, c, the bottom hole of which is large enough to permit the plant to drop freely through it into the hole in the ground at the proper period, while its larger top opening permits any of the plants to be dropped or placed in the funnel most readily, notwithstanding the plants may vary materially in size. Connected with this funnel on each side is fastened a headed pin, 7 7, which passes respectively through the slots 8 8 in the inclined bars 2 3, so that when the bar B is pulled upward it will not only lift the funnel, but also close together the points of bars 2 3, and when pushed down it will separate them, as seen in Figs. 1 and 2, and at the same time push the funnel down, the side-flanges on the shovels serving to keep the plant from coming out at the sides. Rods 9 10 are pivoted at $x$, on the cross-bar, and are respectively jointed at $y\ z$ to similar rods, 11 12, the latter meeting at a joint or pivot, 13, on the funnel, and beyond this point 13 they project still further, the whole forming what is known as a lazy-tongs. These last projections are made in a curved form, as seen at 14 14, and terminate in small flaps, 15 15, which serve, when the plant has been deposited in the earth by the apparatus, and the latter is being drawn from the ground, to bear the loose earth from two opposite sides directly up to the root of the plant, thus leaving it in proper condition for its future growth.

In using the implement, we take hold of the central bar or staff with the left hand, and of the small handle 16 with the right hand, and then by pushing downward with the right hand close the points of the bars 2 3 at $x'$. The plant is now placed in the funnel; the closed shovels, as seen at $x'$, are then pushed into the earth. The staff is held steady, and with the right hand; the other parts are drawn upward, causing the earth-compressing flaps or pressers 15 15, after they have done their duty, to move outward or recede from each other, and thus leave the plant free. The whole apparatus is then raised from the ground, ready for the reception and planting of another plant.

This implement, while adapted more especially for the setting or transplanting of the sweet-potato plant is also equally well adapted for setting or transplanting a great variety of other plants.

We do not claim, broadly, opening blades and pressers, such as are shown in Fuller's patent of February 16, 1869.

We claim—

1. The vertically-moving bar B, and its attached funnel, combined with the converging slotted swinging bars 2 3, substantially as and for the purpose described.

2. The slotted converging swinging bars 2

3, in combination with the funnel and with compressing flaps and the devices by which said flaps are operated.

3. The described construction and arrangement as a whole, whereby the movement of the slide-bar B in one direction causes the shovels to approach while the compressers recede from each other, and the movement of the same bar in the opposite direction causes the shovels to recede while the compressers approach each other.

JAMES P. STANTON.
ROBERT C. PEDRICK.

Witnesses:
 HARRY L. SLOPE,
 RICHARD F. TURNER.